United States Patent Office 2,885,336
Patented May 5, 1959

2,885,336

CATION EXCHANGE MATERIAL AND ITS PREPARATION

Mayer B. Goren, Denver, Colo., and Ira D. Elkins, Cushing, Okla., assignors to Kerr-McGee Oil Industries, Inc., a corporation of Delaware No Drawing. Application October 23, 1956
Serial No. 617,685

22 Claims. (Cl. 208—6)

The present invention relates to carbonaceous ion exchange materials and to the preparation of such materials. More particularly, the present invention is concerned with carbonaceous cation exchange materials having greatly improved cation exchange capacities in both the hydrogen and alkali metal cycles and with a novel and improved process for their preparation.

The preparation of conventional carbonaceous ion exchange materials is described in a number of patents and publications. These materials are generally prepared by treatment of carbonaceous material, such as bituminous coal, peat, lignite, and petroleum asphalts with a sulfonating agent to introduce reactive groups on a relatively insoluble carbonaceous lattice which are capable of undergoing ion exchange reactions with various desired cations in solution. Such sulfonated carbonaceous materials prepared according to conventional processes possess desirable properties of cation exchange materials to varying degrees, but in general have not proven entirely satisfactory. In particular, carbonaceous cation exchange materials as conventionally prepared heretofore have not possessed the desirable properties of cation exchange materials to the degree which is true of cation exchange materials prepared from synthetic polymers, such as polystyrene. Thus carbonaceous cation exchange materials have been at a disadvantage in competing with synthetic polymer cation exchange materials.

Among the characteristics which are desirable in a highly satisfactory cation material useful for softening or deionizing water are:

(1) A high exchange capacity per unit volume or weight of the cation exchange material.

(2) Physical stability; i.e., resistance toward attrition and fining during use. The particles should be mechanically hard and have good resistance toward crushing as determined by controlled attrition tests in a suitable apparatus, such as a ball mill.

(3) Freedom from excessive color throw-off or objectionable taste; i.e., the material should be relatively free of soluble color bodies, and objectionable odor or taste.

(4) The cation exchange material should not show an excessive absorptive capacity for the regenerant; i.e., washing out of the excessive acid or salt used in regenerating the cation material should be quickly and easily achieved and large quantities of wash water should not be needed.

Those skilled in the art have recognized the demand for an improved carbonaceous cation exchange material and for an improved economical process for producing the same from cheap and readily available substances, such as asphaltic bituminous material. However, up until the present invention the art has not been entirely successful in meeting this demand or in providing an improved cation exchange material possessing the above enumerated desirable properties to such an extent as to be competitive with the more expensive synthetic polymer cation exchange materials.

By the term "asphaltic bituminous material" as used hereinafter in the specification and claims is meant semi-solid to solid pyrogenous and naturally occurring asphalts (bitumen and pyrobitumen), one or more semi-solid to solid fractions or components thereof, or semi-solid to solid products obtained by blowing these materials or one or more of their components or fractions with air or an oxygen containing gas in the presence or absence of a catalyst. Examples of such naturally occurring materials include gilsonite, grahamite, wurtzilite, albertite, elaterite, and native asphalts, such as Trinidad asphalt; while examples of pyrogenous materials include propane asphalts, vacuum reduced crudes, cracked tars, etc. Asphalts such as those precipitated from asphaltic crudes having an API gravity of 20 or less by treatment with ethane, propane or other light hydrocarbons are not generally classed as pyrogenous asphalts. However, such precipitated asphalts will be considered as pyrogenous asphalts for the purpose of this specification and claims.

Blown asphaltic bituminous materials include those materials blown with air or an oxygen containing gas either in the presence or absence of catalysts such as phosphorous pentoxide, ferric chloride, cobaltic salts, etc. The terms "components" or "fractions" of pyrogenous and naturally occurring asphalts include asphaltenes, resin and oil mixtures, and separate resin and oil fractions. These may be obtained, for example, by the method described in copending application Serial No. 218,480, filed March 30, 1951, now U.S. Patent No. 2,793,188. Where the term "oil fraction" appears in the specification and claims it is understood that the oil fraction has been blown or treated with a suitable chemical agent before further treatment in accordance with the present invention for the purpose of rendering it semi-solid to solid. The use of chemical treating agents such as aluminum chloride, boron fluoride, and chlorinated materials for this purpose is fully described in U.S. Patent 2,247,375.

The foregoing asphaltic bituminous materials are readily liquefiable on addition of suitable solvent or fusible on heating to elevated temperatures, and possess solubility, hardness at normal ambient temperatures, and reaction characteristics desirable in a semi-solid to solid material for the preparation of cation exchange materials in accordance with the present invention. A further advantage of asphaltic bituminous material over the friable starting materials of the prior art, such as coal, is that no loss of fines occur in the grinding of asphaltic bituminous material to a suitable particle size prior to sulfonation, since the fines which do accumulate may be remelted, recast and reground. This feature is very desirable from an economic standpoint as loss of starting material is completely eliminated and thus results in a lower cost for the final cation exchange product.

It is an object of the present invention to provide a new and improved carbonaceous cation exchange material.

It is a further object of the present invention to provide a new and improved process for economically producing the foregoing carbonaceous cation exchange material.

It is still a further object of the present invention to provide a new and improved carbonaceous cation exchange material characterized by high cation exchange capacity, good physical stability, excellent resistance to color throw-off, freedom from objectionable odor and taste, and a very low adsorptive capacity for the regenerant, with the foregoing desirable properties being possessed in both the hydrogen and alkali metal cycles.

Still other objects and advantages of the present invention will be apparent to those skilled in the art by reference to the following detailed description and the specific examples illustrating the present invention.

It has been discovered that the reaction product of a $SO_3$ sulfonating agent and asphaltic bituminous material which has been treated prior to the sulfonation step in accordance with the invention is a greatly improved carbonaceous cation exchange material.

In accordance with the present invention, prior to the sulfonation step hydrocarbon oily substance containing an appreciable cyclic hydrocarbon content is incorporated with asphaltic bituminous material to form a blend and the resulting blend is then treated under suitable conditions to effect condensation of certain of its components. The degree of condensation is controlled to give a treated asphaltic bituminous material product preferably having a softening point at least as high as the asphaltic bituminous material used in preparing the blend. The treated asphaltic bituminous material resulting from condensation of the foregoing blend is then cooled until solidified, crushed and sized to obtain particles of a suitable size for use in the subsequent sulfonation step. The particulated treated asphaltic bituminous material thus obtained is then sulfonated with a suitable sulfonating agent under conditions suitable for introducing reactive groups thereon which are capable of undergoing an ion exchange reaction with various desired cations. The sulfonated product may then be washed free of excess sulfonating agent, treated with sodium hydroxide solution, washed free of sodium hydroxide, and dried to thereby obtain the improved cation exchange material of the present invention in a commercially desirable form.

The preferred asphaltic bituminous materials are the fusible or liquefiable bitumens of petroleum origin such as petroleum refined crude bottoms, asphaltic resins, asphaltenes and their blown products. Generally, the use of asphaltic bituminous material having a softening point of 300° F. or higher will provide even better carbonaceous cation exchange materials in accordance with the invention.

The hydrocarbon oily substances containing appreciable cyclic hydrocarbon content which are suitable for incorporation with asphaltic bituminous material in accordance with the invention may be divided into refractory oily substances and non-refractory oily substances. Examples of refractory oily substances include products of an aromatic nature which are derived from a catalytic cracking operation, such as tube still distillates and cat-cracker recycle oils; while nonrefractory oily substances include materials such as naphthenic rejects obtained with selective solvents such as phenol, Chlorex, sulfur dioxide, etc., in the manufacture of lubricating oil.

The paraffinic hydrocarbon content of the hydrocarbon oily substances should be less than about 40%. The preferred hydrocarbon oily substances are further characterized by a specific gravity change at 60° F. of at least 0.03 unit when treated with fuming sulfuric acid, an aniline point less than 80° F., and a Watson and Nelson characterization factor preferably less than 10.50. The preferred refractory oily substances are highly cyclic distillates obtained from either thermal or catalytic cracking and are, in general, characterized by the following typical chemical composition: 30–45% aromatic and unsaturated hydrocarbons, 30–55% naphthenic hydrocarbons, and the remainder being principally paraffinic hydrocarbons. The terms "hydrocarbon oily substance," "refractory oily substance," and "non-refractory oily substance" which appear in the specification and claims are intended to refer to materials as defined above.

One preferred procedure for incorporating the oily substance with the asphaltic bituminous material comprises fusing the asphaltic bituminous material to a temperature high enough to achieve a working fluidity and then adding the desired quantity of oily substance thereto with agitation, if needed. The resulting blend, preferably, should contain the oily substance uniformly distributed in finely divided form throughout the asphaltic bituminous material. The quantity of oily substance added to the asphaltic bituminous material may vary between about 5% to 80% by weight of the resulting blend, but generally the addition of about 5% to 25% by weight is sufficient and thus preferred for economic and other reasons. For example, if the amount of oily substance is increased above about 25%, the ratio of asphaltenes to resins-oils may be such in the final condensed product as to effect a degree of incompatibility as indicated by changes in appearance, sweating or extruding of oily substance. The addition of oily substance in quantities less than about 5% by weight of the blend does not usually provide the desired degree of improvement in cation exchange properties, while the addition of above 80% by weight of oily substance results in an ultimate product which does not possess desirable asphaltic properties, or in the masking of such properties.

The blend of oily substance with asphaltic bituminous material is treated under conditions suitable for condensing certain components of the blend. The preferred method of carrying out the condensation step is by air oxidizing or blowing. This blowing operation may comprise heating the blend to a temperature in excess of about 450° F. but at a temperature less than its cracking temperature and then passing air or other suitable oxygen containing gas through the blend until the softening point thereof is at least about as high as the softening point of the asphaltic bituminous material used in preparing the blend. Generally, the softening point of the blend after the condensation step is completed, this product being sometimes referred to herein as treated asphaltic bituminous material, should be in excess of about 300° F. for best results. Components of the blend may also be condensed by the use of chemical treating agents, such as aluminum chloride, boron fluoride and chlorinated materials as described in U.S. Patent 2,247,375.

After the condensation step is completed, the treated asphaltic bituminous material is allowed to cool and solidify. The solidified treated asphaltic bituminous material is then crushed and sized to obtain particles of a suitable size and, preferably, of a size which will pass 10 mesh screen but which will be retained by 50 mesh screen. The fines passing the 50 mesh screen may be refused, resolidified and reground to obtain additional 10–50 mesh material.

Sulfonation of the sized treated asphaltic bituminous material may be carried out by any suitable method using concentrated sulfuric acid, sulfur trioxide or oleum or other suitable sulfonating agent. Such sulfonating agents may be referred to herein as $SO_3$ sulfonating agents. A double sulfonation process is particularly preferred in order to obtain superior cation exchange material having a capacity considerably greater than in instances where a single sulfonation process is used. The preferred double sulfonation process comprises a first sulfonation with concentrated sulfuric acid followed by a second sulfonation with oleum.

When carrying out the sulfonation step in accordance with the preferred double sulfonation process, the treated asphaltic bituminous material is first sulfonated with about 1–8 parts by weight of concentrated sulfuric acid for each part by weight of treated asphaltic bituminous material. However, smaller quantities of concentrated sulfuric acid may be employed in some instances. The temperature of the sulfonation is preferably maintained at about 158° F. to 302° F. The time required for the first sulfonation is usually several hours in duration, e.g.; 2 to 4 hours, although shorter periods of time may be employed in some instances.

After initial sulfonation of the treated asphaltic bituminous material with concentrated sulfuric acid, the residual acid remaining from the first sulfonating step is drained from the once sulfonated product before proceeding with the final sulfonation step. Preferred carbonaceous cation exchange materials may be obtained when approximately 2–10 parts by weight of oleum are used for each part by weight of the once sulfonated treated asphaltic bituminous material. The percent of free $SO_3$ in the oleum employed is not critical, although preferred results may be obtained when using a 20% oleum rather than 10%. The oleum sulfonation is preferably carried out at a temperature of about 158° F. to 302° F. for a period of about 1 to 3 hours, although satisfactory products may be obtained in some instances in a shorter period of time.

After sulfonation of the treated asphaltic bituminous material, the sulfonated product may be allowed to cool, then thoroughly washed to remove excess acid and dried. If desired, the sulfonated product may be converted to the alkali metal cycle by treatment with sodium hydroxide solution followed by a water wash and drying. The resulting product is characterized by high cation exchange capacity, exceptional physical stability, excellent resistance to color throw-off, freedom from objectionable odor and taste, low adsorptive capacity for regenerant, maintains high capacity after repeated cycles of regeneration, and is much superior to carbonaceous cation exchange materials prepared by conventional processes.

The following specific examples further illustrate the present invention:

Example I

Resin having a softening point of 300–330° F. was separated from an asphalt having a softening point of 100–120° F. by conventional treatment at elevated temperature and pressure with pentane. This resin was then heated to obtain a working fluidity and blended with heavy catalytic cracked recycle oil of 35.6 sec. Saybolt Universal viscosity at 210° F. and of 8–10° API gravity at 60° F. The composition of the blend was 75% by weight resin and 25% by weight catalytic cracked recycle oil, and the blend had a softening point of 187° F.

The resulting blend was blown with air at 550° F. for a period of time up to 18 hours, with samples of the blown blend being taken after 3, 7, 13 and 18 hours of blowing time. The softening points of the blown samples for 3, 7, 13 and 18 hours of blowing time were 233° F., 277° F., 356° F. and about 425° F., respectively. These blown samples were cooled until solidified, crushed and sized to obtain particles having a size of 20–40 mesh.

A 200 gram portion of each of the above blown and sized samples was treated for a period of 2 hours at 212° F. with 300 ml. of concentrated sulfuric acid (98% $H_2SO_4$). At the end of the first sulfonation step, the excess acid was drained off and then a second sulfonation step was carried out on each sample by treatment for a period of two hours at 212° F. with 300 ml. of 20% fuming sulfuric acid. After completion of the second sulfonation step, the sulfonated products were drowned in water and washed until free of sulfuric acid. The washed twice sulfonated products were contacted with 20% sodium hydroxide solution for a period of about 2 hours at a temperature of about 212° F. The resulting products were then washed with distilled water until excess sodium hydroxide was removed therefrom and dried.

The cation exchange materials as above prepared were characterized by high cation exchange capacity, good physical stability, excellent resistance to color throw-off, freedom from objectionable odor and taste and low adsorptive capacity for regenerant. The demineralization capacity was exceptional when tested by standard practices outlined as follows.

An ion exchange column was charged with 200 ml. of the product obtained by the foregoing procedure using the 18 hour blown sample having a softening point of 425° F. This ion exchange column was used to demineralize standard hard water (400 p.p.m. expressed as calcium carbonate) until the cation exchange material was exhausted and no longer adsorbed calcium ion. The ion exchange column was then regenerated with 7% sodium chloride solution. This demineralization and regeneration cycle was repeated over numerous such cycles. The following results were obtained:

| Cycles Operated | Standard Hard Water, 400 p.p.m. Ca++ Equivalent in ml. per cycle |
| --- | --- |
| 4 | 10,250 |
| 37 | 9,405 |
| 65 | 12,331 |
| 72 [1] | 14,543 |
| 78 [2] | 14,401 |

[1] After regeneration for 65 cycles with 7% sodium chloride solution as a regenerant, the remaining 7 cycles were carried out with dilute hydrochloric acid as a regenerant. It will be noted that the capacity of the cation exchange material was increased slightly, while normal experience is a slight decrease.

[2] After regeneration for 65 cycles with 7% sodium chloride solution followed by regeneration for 7 cycles with dilute hydrochloric acid, regeneration over the remaining 6 cycles was with 7% sodium chloride solution. It may be noted that the capacity of the cation exchange resin decreased slightly.

The above results were compared with the same quantities of commercial sulfonated coal cation exchange materials. The commercial sulfonated coal cation exchange materials were found to give an initial capacity of 9,775 ml. of standard hard water per cycle under the above conditions, with sodium chloride regeneration, and 9,210 ml. with dilute hydrochloric acid regeneration. Thus, the superiority of the cation exchange material prepared by the process of the present invention is clearly apparent.

Example II

An asphalt having a softening point of 100–120° F. was heated sufficiently to obtain a working fluidity and then blended with naphthenic reject (naphthenic extract of phenol). The composition of this blend was 75% by weight asphalt and 25% by weight naphthenic reject.

The above blend was then treated in accordance with the teachings of U.S. Patent 2,247,375 using aluminum chloride as the catalyst for a period of time sufficient to produce a product having a softening point of about 350° F. and a lower 86° naphtha solubility than the original asphalt. The treated blend was then cooled, crushed and sized to obtain particles of 20–40 mesh.

A 200 gram portion of the above prepared 20–40 mesh material was treated for two hours at 212° F. with 300 ml. of concentrated sulfuric acid (98% $H_2SO_4$). Excess sulfuric acid was drained from the once sulfonated product and an additional sulfonation treatment was then carried out at a temperature of 212° F. and for a period of 2 hours using 300 ml. of 20% fuming sulfuric acid. The twice sulfonated product was then drowned in water and washed until free of sulfuric acid. The washed twice sulfonated product was contacted with 20% sodium hydroxide solution for a period of about 2 hours and at a temperature of 212° F. The resulting product was then washed with water until excess sodium hydroxide was removed and dried.

The above prepared carbonaceous cation exchange material was tested in the manner outlined in Example I by charging an ion exchange column therewith and using this column to demineralize standard hard water containing 400 p.p.m. calcium carbonate until the carbonaceous ion exchange material was exhausted. The ion exchange column was then regenerated with a 7% sodium chloride solution and this demineralization and regeneration cycle repeated over numerous such cycles. The results obtained by the foregoing procedure were substantially identical with the results of Example I.

The addition of oily substance containing appreciable amount of cyclic hydrocarbon has been described and illustrated herein as having been incorporated with asphaltic bituminous material before the condensation step. While this is a preferred procedure, it may be possible in some instances to condense, or at least partially condense, the oily substance before incorporation with the asphaltic bituminous material. As a general rule, the oily substance is more difficult to incorporate with the asphaltic bituminous material after condensation and does not appear to offer any appreciable advantage over the preferred procedure. When the oily substance is recycle oil, it is difficult to carry out a condensation step prior to incorporation with asphaltic bituminous material due to excessive loss of material by distillation. Even when recycle oil is incorporated with the asphaltic bituminous material prior to the condensation step, the loss of material may become excessive. This is particularly true when extended periods of blowing time are used. For example, in the 18 hour blown product of Example I, it was found that about 88% of the material distilled away during the condensation step. When oily substance is blown in the presence of asphaltic bituminous material there appears to be a reaction between components of the blend which results in a final product that is more than a mere blend of the two substances. Thus, a condensation reaction is carried out after the oily substance is incorporated with asphaltic bituminous material even in instances where the oily substance is condensed, or partially condensed, prior to incorporation with asphaltic bituminous material.

The foregoing detailed description of the present invention and the specific examples are for the purpose of illustration only and are not to be taken as limiting to the scope or spirit of the appended claims.

What is claimed is:

1. A process for preparing an ion exchange material which comprises incorporating a hydrocarbon oily substance containing an appreciable amount of cyclic hydrocarbons with asphaltic bituminous material in an amount from 5–80% by weight of the resulting mixture, condensing the oily substance by subjecting the oily substance to a condensation reaction, and then sulfonating the asphaltic bituminous material having oily substance incorporated therein.

2. The method of claim 1 wherein the asphaltic bituminous material having oily substance incorporated therein is first sulfonated with concentrated sulfuric acid to produce a once sulfonated product, and then the once sulfonated product is further sulfonated with oleum.

3. The method of claim 1 wherein a refractory oily substance is incorporated with the asphaltic bituminous material.

4. The method of claim 3 wherein the refractory oily substance is recycle oil.

5. The method of claim 1 wherein a non-refractory oily substance is incorporated with the asphaltic bituminous material.

6. The method of claim 5 wherein the non-refractory oily substance is naphthenic reject obtained with a selective solvent in the manufacture of lubricating oil.

7. A process for preparing a cation exchange material which comprises incorporating a hydrocarbon oily substance containing an appreciable amount of cyclic hydrocarbons with asphaltic bituminous material in an amount from 5–80% by weight of the resulting mixture, condensing the resulting mixture of asphaltic bituminous material having oily substance incorporated therein by subjecting the mixture to a condensation reaction for a period of time sufficient to produce a product having a softening point at least as high as the softening point of the asphaltic bituminous material used in preparing the mixture, and then sulfonating the asphaltic bituminous material having oily substance incorporated therein.

8. The method of claim 7 wherein the asphaltic bituminous material having oily substance incorporated therein is first sulfonated with concentrated sulfuric acid to produce a once sulfonated product, and then the once sulfonated product is further sulfonated with oleum.

9. The method of claim 7 wherein the asphaltic bituminous material has a softening point of at least 300° F.

10. The method of claim 7 wherein a refractory oily substance is incorporated with the asphaltic bituminous material.

11. The method of claim 10 wherein the refractory oily substance is recycle oil.

12. The method of claim 7 wherein a non-refractory oily substance is incorporated with the asphaltic bituminous material.

13. The method of claim 12 wherein the non-refractory oily substance is naphthenic reject obtained with a selective solvent in the manufacture of lubricating oil.

14. A process for preparing a cation exchange material which comprises incorporating a hydrocarbon oily substance containing an appreciable amount of cyclic hydrocarbons with asphaltic bituminous material in an amount from 5–80% by weight of the resulting mixture, blowing the mixture of asphaltic bituminous material having oily substance incorporated therein with an oxygen containing gas for a period of time sufficient to produce a product having a softening point at least as high as the asphaltic bituminous material used in preparing the mixture, sulfonating the blown mixture of asphaltic bituminous material having oily substance incorporated therein with a sulfonating agent, and then removing aqueous alkali-soluble sulfonating agent reaction products from the sulfonated material.

15. The method of claim 14 wherein the blown mixture of asphaltic bituminous material having oily substance incorporated therein is first sulfonated with concentrated sulfuric acid to produce a once sulfonated product, and then the once sulfonated product is further sulfonated with oleum.

16. The method of claim 14 wherein the asphaltic bituminous material has a softening point of at least 300° F.

17. The method of claim 14 wherein a refractory oily substance is incorporated with the asphaltic bituminous material.

18. The method of claim 17 wherein the refractory oily substance is recycle oil.

19. The method of claim 14 wherein a non-refractory oily substance is incorporated with the asphaltic bituminous material.

20. The method of claim 19 wherein the non-refractory oily substance is naphthenic reject obtained with a selective solvent in the manufacture of lubricating oil.

21. An ion exchange material comprising the reaction product between a sulfonating agent and asphaltic bituminous material having a hydrocarbon oily substance containing an appreciable amount of cyclic hydrocarbons incorporated therein in an amount from 5–80% by weight of the resulting mixture, the mixture of asphaltic bituminous material having oily substance incorporated therein being condensed prior to sulfonation by subjecting the mixture to a condensation reaction for a period of time sufficient to produce a condensed product having a softening point at least as high as the asphaltic bituminous material used in preparing the mixture.

22. The cation exchange material of claim 21 wherein the asphaltic bituminous material having oily substance incorporated therein is first sulfonated with concentrated sulfuric acid to produce a once sulfonated product, and then the once sulfonated product is further sulfonated with oleum.

References Cited in the file of this patent

UNITED STATES PATENTS

| | | |
|---|---|---|
| 2,748,057 | Goren | May 29, 1956 |
| 2,774,724 | Watson | Dec. 18, 1956 |